US007124038B2

United States Patent
van Dam et al.

(10) Patent No.: US 7,124,038 B2
(45) Date of Patent: Oct. 17, 2006

(54) METHOD AND APPARATUS FOR AUTOMATICALLY GENERATING AIRFOIL PERFORMANCE TABLES

(75) Inventors: Cornelis P. van Dam, Davis, CA (US); Edward A. Mayda, Davis, CA (US); Roger Clayton Strawn, Mountain View, CA (US)

(73) Assignee: The Regents of the University of California, Oakland, CA (US)

( * ) Notice: Subject to any disclaimer, the term of this patent is extended or adjusted under 35 U.S.C. 154(b) by 46 days.

(21) Appl. No.: 11/004,716

(22) Filed: Dec. 2, 2004

(65) Prior Publication Data

US 2005/0246110 A1    Nov. 3, 2005

Related U.S. Application Data

(60) Provisional application No. 60/526,686, filed on Dec. 2, 2003.

(51) Int. Cl.
*G01F 19/00*    (2006.01)

(52) U.S. Cl. ............................. 702/50; 703/1

(58) Field of Classification Search .................... 702/50
See application file for complete search history.

(56) References Cited

U.S. PATENT DOCUMENTS 5,544,524 A * 8/1996 Huyer et al. .................. 73/147
6,516,292 B1 * 2/2003 Yahalom ........................ 703/9

* cited by examiner

*Primary Examiner*—Michael Nghiem
*Assistant Examiner*—Stephen J. Cherry
(74) *Attorney, Agent, or Firm*—Park, Vaughan & Fleming LLP; Edward J. Grundler (57) ABSTRACT

One embodiment of the present invention provides a system that facilitates automatically generating a performance table for an object, wherein the object is subject to fluid flow. The system operates by first receiving a description of the object and testing parameters for the object. The system executes a flow solver using the testing parameters and the description of the object to produce an output. Next, the system determines if the output of the flow solver indicates negative density or pressure. If not, the system analyzes the output to determine if the output is converging. If converging, the system writes the output to the performance table for the object.

33 Claims, 8 Drawing Sheets

METHOD AND APPARATUS FOR AUTOMATICALLY GENERATING AIRFOIL PERFORMANCE TABLES

RELATED APPLICATION

This application hereby claims priority under 35 U.S.C. §119 to U.S. Provisional Patent Application No. 60/526,686, filed on 2 Dec. 2003, entitled "A General Computational Fluid Dynamics-Based Methodology to Automatically Generate Parameterized Airfoil Performance Data," by inventors C. P. van Dam and E. A. Mayda, which is incorporated herein by reference

GOVERNMENT LICENSE RIGHTS

This invention was made with United States Government support under NASA Ames Cooperative Agreement Number NCC 2-5485 awarded by Ames Research Center Grant Office, Mail Stop 241-1, Moffett Field, Calif. 94035-1000. The United States Government has certain rights in the invention.

BACKGROUND

1. Field of the Invention

The present invention relates to airfoil performance. More specifically, the present invention relates to a method and an apparatus for automatically generating airfoil performance tables.

2. Related Art

In order to analyze the performance of an airfoil, airfoil analysis codes typically make extensive use of two-dimensional performance data. This two-dimensional airfoil performance data is typically stored in "C81 airfoil performance tables." C81 tables are text files, which list the lift coefficient, drag coefficient and pitching moment coefficient as functions of angle of attack for a range of Mach numbers. Typically, the angle of attack spans angles from −180° to 180°, while the Mach number ranges from 0.0 to 1.0. In the past, tables were created from experimental data and researchers' best estimates as to how the airfoil should perform at certain flow conditions.

Due to the high cost of wind tunnel tests, only a handful of airfoil sections have been tested over the entire 360° angle of attack and Mach number ranges. These data are often faired into tables being created for new geometries as a way of filling in the gaps where experimental data is not available. Due to this process, it is difficult to ensure any level of consistency in existing tabular data as far as compressibility effects, viscous effects or even sectional geometries are concerned.

C81 tables are thus often incomplete, and often contain inconsistencies in reference Reynolds numbers, airfoil geometry, and the like. These problems make relying on C81 tables for design tradeoff studies and geometry modifications problematic at best.

Hence, what is needed is a method and an apparatus for automatically generating airfoil performance tables without the problems described above.

SUMMARY

One embodiment of the present invention provides a system that facilitates automatically generating a performance table for an object, wherein the object is subject to fluid flow. The system operates by first receiving a description of the object and testing parameters for the object. The system executes a flow solver using the testing parameters and the description of the object to produce an output. Next, the system determines if the output of the flow solver indicates negative density or pressure. If not, the system analyzes the output to determine if the output is converging. If converged, the system writes the output to the performance table for the object.

In a variation of this embodiment, if the output of the flow solver indicates negative density or pressure, the system adjusts a testing parameter and repeats executing the flow solver to produce a new output. The system then determines if the new output indicates negative density or pressure.

In a further variation, if the system mode is "steady-state," adjusting the testing parameter involves decreasing a time step for the flow solver.

In a further variation, if the system mode is "time-accurate," adjusting the testing parameter involves modulating a Courant-Friedrichs-Levy number limit for the flow solver.

In a further variation, if the system mode is time-accurate, adjusting the testing parameter involves adjusting a physical time step for the flow solver.

In a further variation, if the system mode is time-accurate, adjusting the testing parameter involves adjusting a pseudo-time step for the flow solver.

In a further variation, if the system mode is steady-state, analyzing the output involves analyzing a residual error using a regression analysis.

In a further variation, if the history of the residual error indicates numerical divergence, the system sets the system mode to time-accurate.

In a further variation, if the system mode is steady-state, analyzing the output involves analyzing a performance parameter for the object using a moving average technique, wherein the performance parameter includes, but is not limited to. lift, drag, and pitching moment.

In a further variation, if the system mode is time-accurate, analyzing the output involves performing a time-correlation analysis of a performance parameter history.

In a further variation, being subject to fluid flow includes fluid flow through and/or over the object.

SYMBOLS AND ABBREVIATIONS $\rho$ density
$\mu$ viscosity
e energy
$\gamma$ ratio of specific heats
$\tau$ shear stress
p pressure
c airfoil chord length
l characteristic reference length
t time
x,y Cartesian coordinates
$\xi,\eta$ computational domain spatial coordinates
u,v velocity components in the x and y directions, respectively
a speed of sound, $a^2=\gamma p/\rho$
Re Reynolds number, $Re=\rho u_\infty c/\mu$
Pr Prandtl number
M Mach number, $M=\sqrt{u^2+v^2}/a$
$\alpha$ angle of attack
$C_l, C_d, C_m$ coefficients of lift, drag and pitching moment (about 0.25c), respectively
dt timestep
$\kappa$ scaling constant or dissipation coefficient
$\epsilon$ tolerance value
CFL Courant-Friedrichs-Levy number
A sample interval used for correlation stencil
B sample interval being compared to correlation stencil
n number of values in samples A and B
j summation index
s statistical variance variable for correlation analysis
r correlation coefficient
R modified correlation coefficient
SF correlation analysis scaling factor
$\Phi,\Pi$ weight factors used to calculate the correlation factor
CF correlation factor
SS steady-state
TA time-accurate
MWT maximum wall time allotted per case Subscripts
pseudo denotes pseudo timestep
ma value pertaining to the moving-average analysis
max maximum value or upper limit for a variable
floor absolute lowest value a variable can be assigned
sf value pertaining to the scaling factor of the correlation analysis
A, B correlation analysis stencil and subinterval
f farfield values
$\infty$ freestream values
user user specifiable variable
x,y Cartesian coordinate directions
$\xi,\eta$ curvilinear coordinate directions

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Processing System

Figure 1:
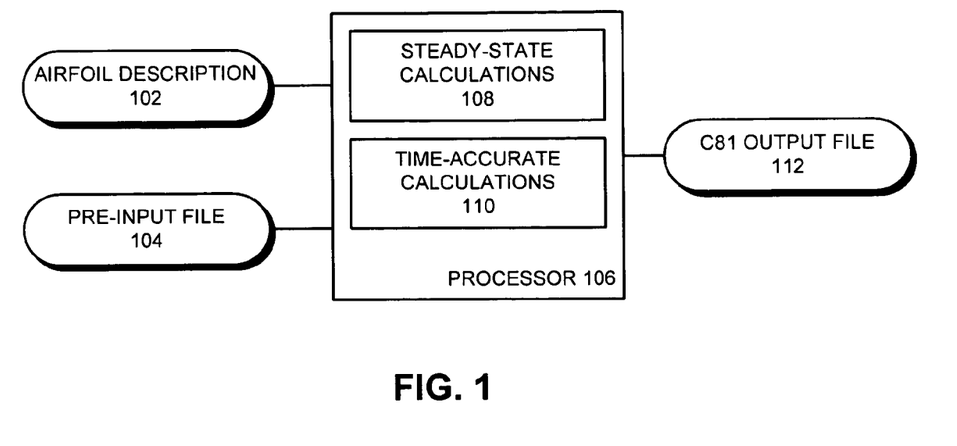
FIG. 1 illustrates an airfoil performance processing system in accordance with an embodiment of the present invention.

FIG. 1 illustrates an airfoil performance processing system in accordance with an embodiment of the present invention. The airfoil processing system includes processor 106. Processor 106 can generally include any type of computer system, including, but not limited to, a computer system based on a microprocessor, a mainframe computer, a digital signal processor, a portable computing device, a personal organizer, a device controller, and a computational engine within an appliance.

Processor 106 receives airfoil description 102 and pre-input file 104 and generates C81 output file 112. Pre-input 104 file contains the test parameters for testing the airfoil. Processor 106 can perform two types of calculations: steady-state calculations 108, and time-accurate calculations 110. Steady-state calculations are typically applicable to conventional flow conditions such as small angles of attack with fully attached flow for which the solution is time-independent. Conversely, time-accurate calculations model the temporal behavior of time-varying flows. The automation techniques developed in this specification use both calculation techniques either independently or in combination with one another.

Airfoil Performance Calculations

Figure 2A:
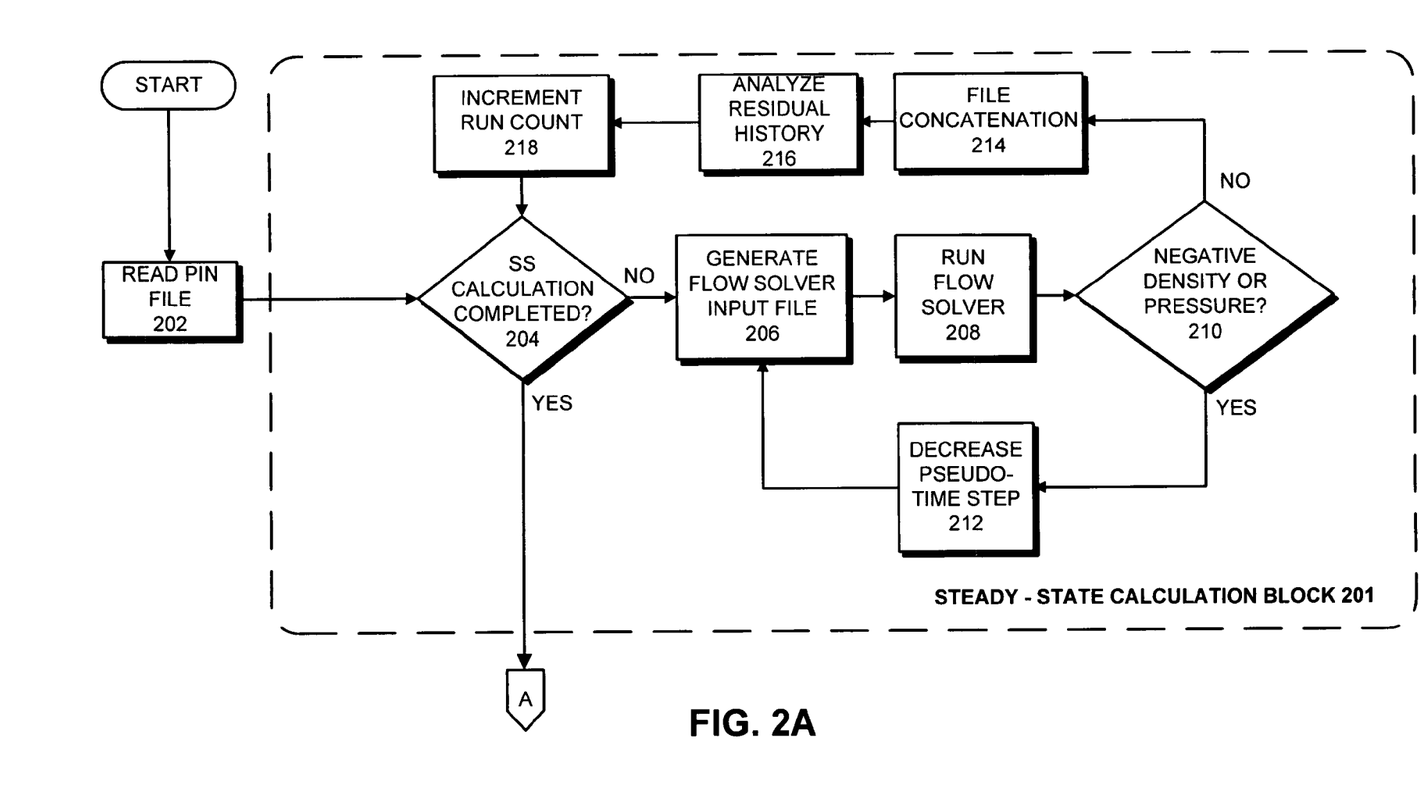
FIG. 2A presents a flowchart illustrating a steady-state calculation block in accordance with an embodiment of the present invention.

FIG. 2A presents a flowchart illustrating operation of a steady-state calculation block 201 in accordance with an embodiment of the present invention. The system starts by reading a pre-input (PIN) file (step 202). Next, the system checks for completion of steady-state calculations (step 204). This check is described in more detail in conjunction with FIG. 5 below. If the steady-state calculation is not complete, the system generates a flow solver input file (step 206). Next, the system executes the flow solver using the input file (step 208). Note that many different flow solvers can be used in this step. Details of a specific flow solver are presented below.

The output of flow-solver 208 is checked for negative density and/or pressure (step 210). Note that a negative density or a negative pressure is not possible in the physical world. If the pressure or density is negative, the system decreases the pseudo-time step (step 212) and returns to step 206 to generate a new flow solver input file. The process of decreasing the pseudo-time step is described in more detail below in conjunction with FIG. 4.

If the pressure and density are not negative at step 210, the system concatenates the output of the flow solver to an output file (step 214). Next, the system analyzes the residual history of the force and pitching moments (step 216) and increments the run count (step 218). Details of analyzing the residual history are presented in more detail below. The process then returns to step 204 to determine if the steady-state calculations are complete. If so, the system determines if satisfactory results were obtained during the steady-state calculations (step 220 in FIG. 2B). If not, the system switches to time-accurate mode.

Figure 2B:
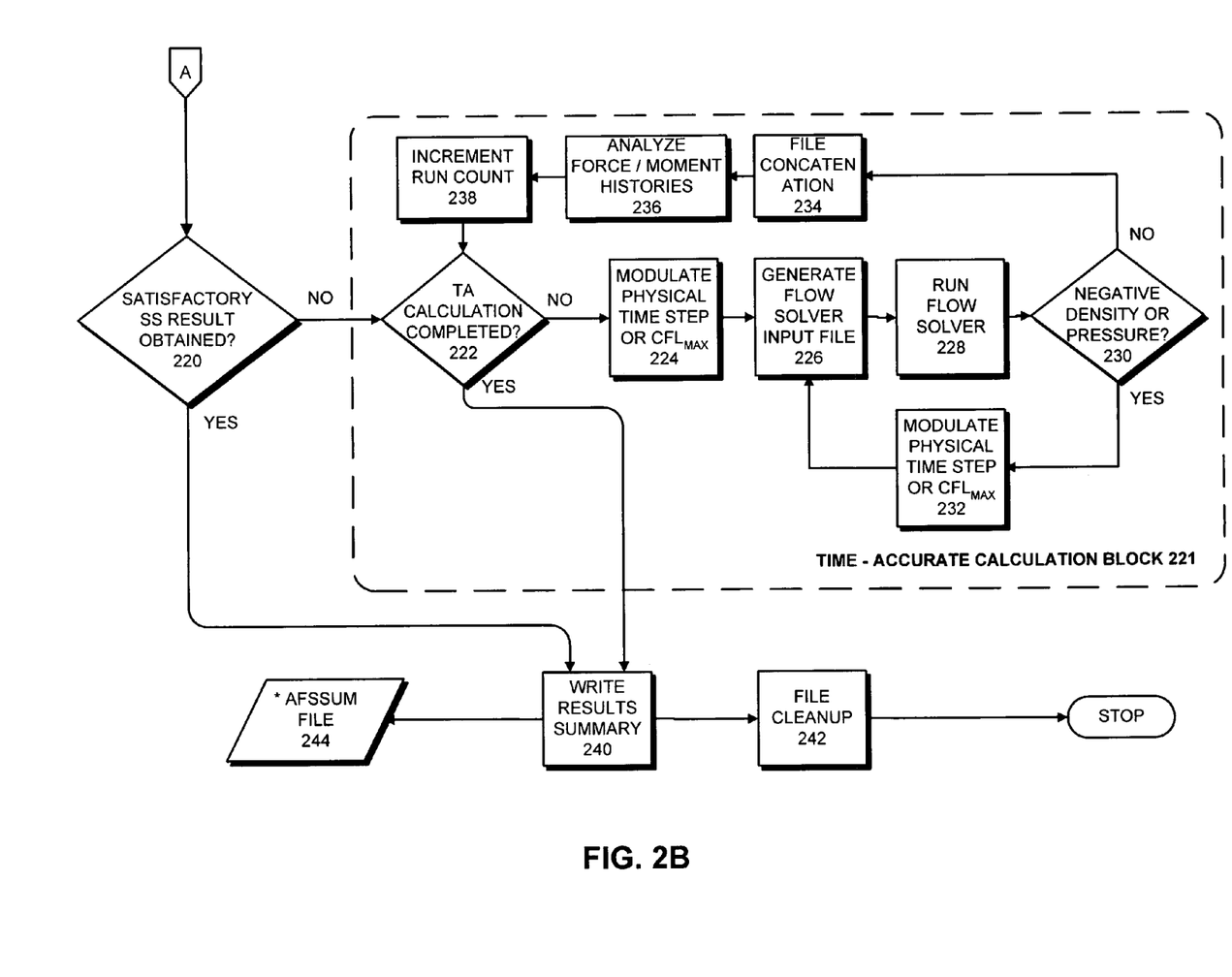
FIG. 2B presents a flowchart illustrating a time-accurate calculation block in accordance with an embodiment of the present invention.

FIG. 2B presents a flowchart illustrating operation of a time-accurate calculation block 221 in accordance with an embodiment of the present invention. The system first determines if the time-accurate calculations are complete (step 222). If not, the system modulates the physical time step or the Courant-Friedrichs-Levy number upper limit ($CFL_{max}$) (step 224). Next, the system generates a flow solver input file using the modulated physical time step or the modulated $CFL_{max}$ (step 226) and executes the flow solver using the input file (step 228). Note that the flow solver is typically the same flow solver used at step 208.

The output of flow-solver 228 is then checked for negative density and/or pressure (step 210). If the pressure or density is negative, the system modulates the physical time step or $CFL_{max}$ (step 232) and returns to step 226 to generate a new flow solver input file. The process of modulating the physical time step or $CFL_{max}$ is presented in detail below in conjunction with FIG. 5.

If the pressure and density are not negative at step 230, the system concatenates the output of the flow solver to an output file (step 234). Next, the system analyzes the force/moment histories (step 236) and increments the run count (step 238). Details of analyzing the force/moment histories are presented in detail below. The process then returns to step 222 to determine if the steady-state calculation is complete.

If satisfactory steady-state results are obtained at step 220 or if the time-accurate calculations are complete at step 222, the system writes the output file 224 (step 240). Finally, the system performs a file cleanup by deleting temporary files (step 242).

Varying Steady-State Input Parameters

Figure 3:
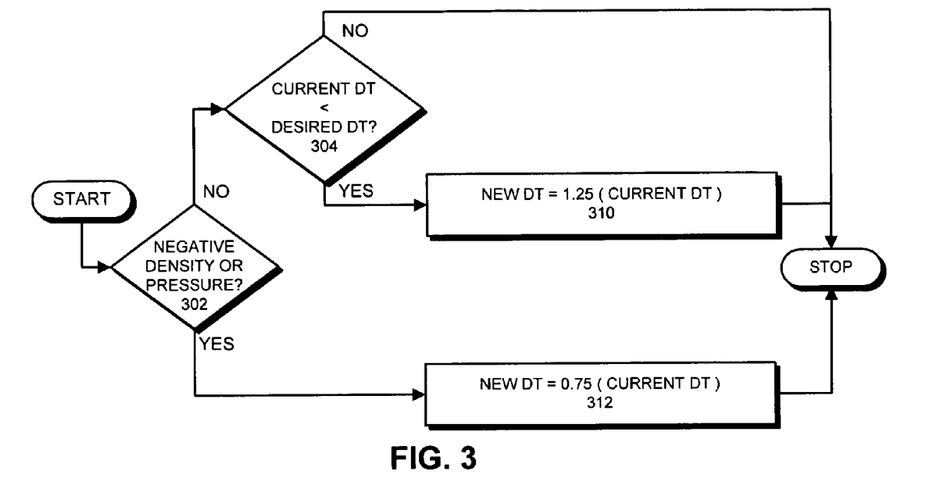
FIG. 3 presents a flowchart illustrating the process of varying input parameters in steady-state mode in accordance with an embodiment of the present invention.

FIG. 3 presents a flowchart illustrating the process of varying input parameters in steady-state mode in accordance with an embodiment of the present invention. The system starts by determining if the pressure or density is negative (step 302). If so, the system sets the time step to 0.75 times the current time step (step 312). If the pressure and density are not negative at step 302, the system determines if the current time step is less than the desired time step (step 304). If so, the system set the time step to 1.25 times the current time step (step 310) Note, that different multipliers can be used in any of these calculations.

Varying Time-Accurate Input Parameters

Figure 4:
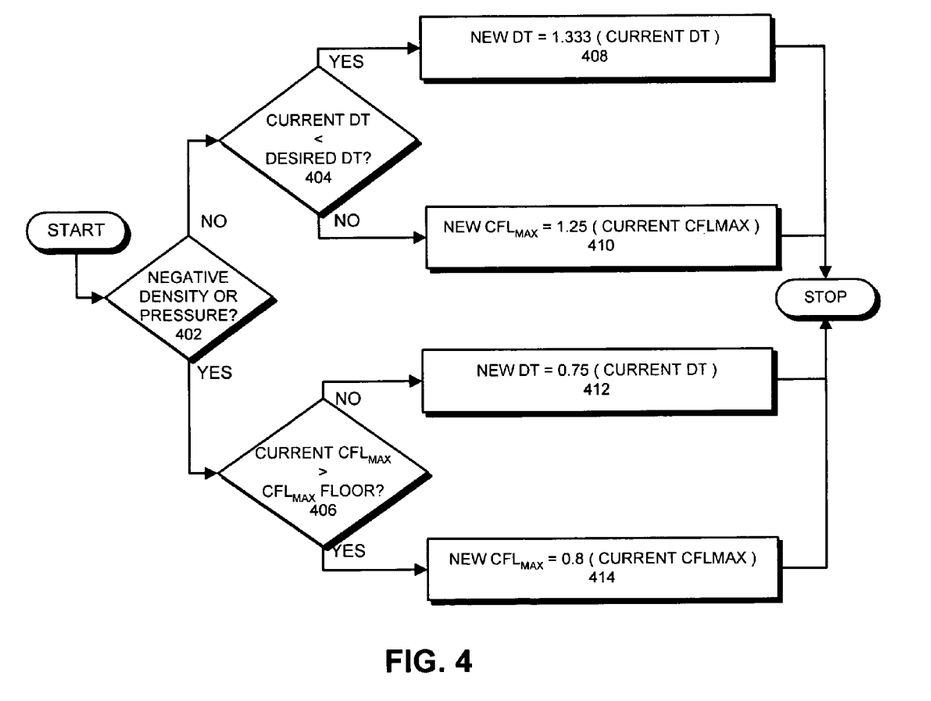
FIG. 4 presents a flowchart illustrating the process of varying input parameters in time-accurate mode in accordance with an embodiment of the present invention.

FIG. 4 presents a flowchart illustrating the process of varying input parameters in time-accurate mode in accordance with an embodiment of the present invention. The system starts by determining if the pressure or density is negative (step 402). If so, the system determines if the current $CFL_{max}$ is greater than the $CFL_{max}$ floor (step 406). If so, the system sets $CFL_{max}$ to 0.8 times the current $CFL_{max}$ (step 414). Otherwise, the system sets the time step to 0.75 times the current time step (step 412).

If the pressure and density are not negative at step 402, the system determines if the current time step is less than the desired time step (step 404). If so, the system sets the time step to 1.333 times the current time step (step 408). Otherwise, the system sets $CFL_{max}$ to 1.25 times the current $CFL_{max}$ (step 410). Note, that different multiplicative parameters can be used in any of these calculations.

Determining if Calculations are Complete

Figure 5:
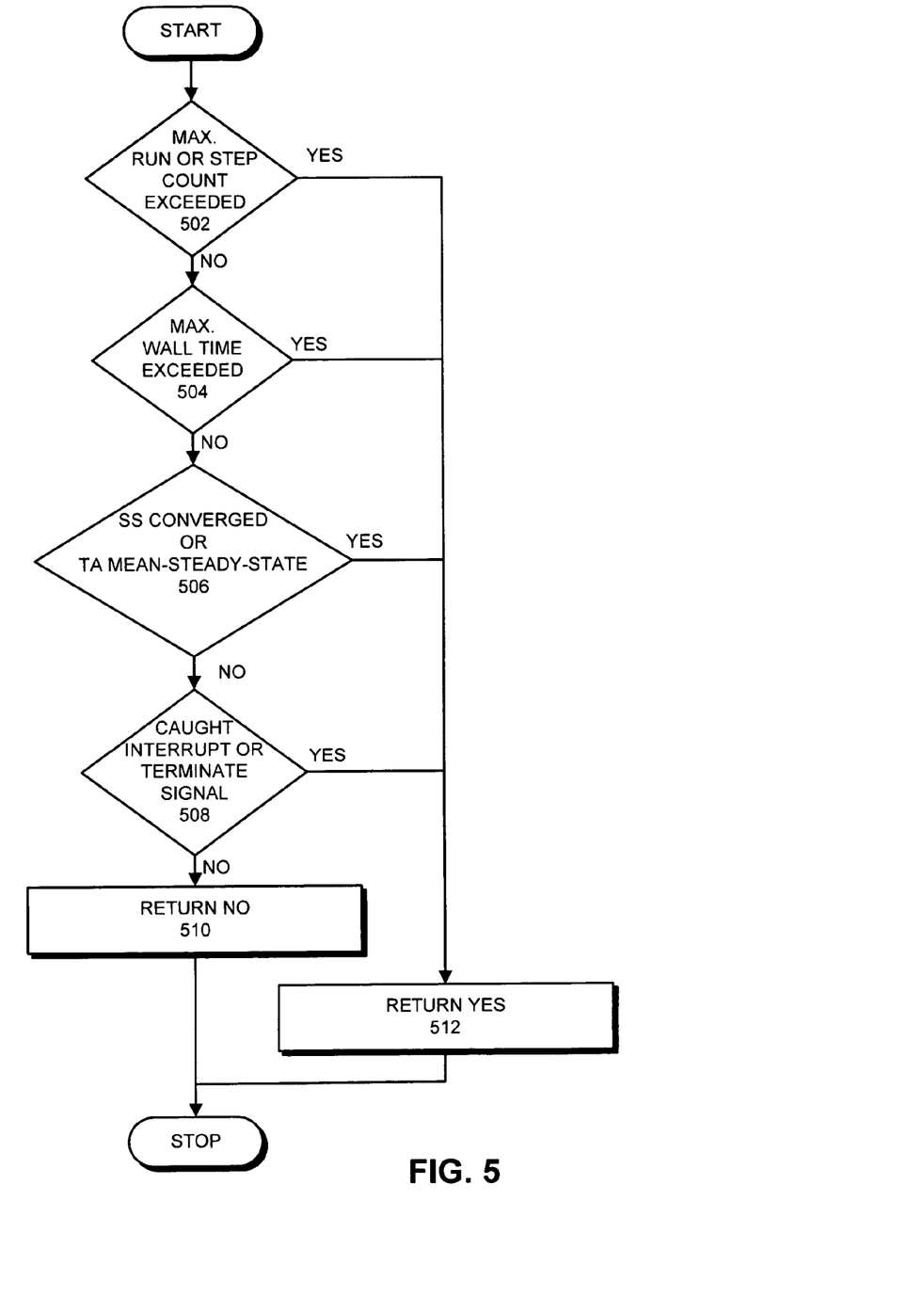
FIG. 5 presents a flowchart illustrating the process of determining if the calculations are complete in accordance with an embodiment of the present invention.

FIG. 5 presents a flowchart illustrating the process of determining if the calculations are complete in accordance with an embodiment of the present invention. Note that this process relates to both step 204 and 222 above. The system starts by determining if the maximum run time or step count has been exceeded (step 502). If not, the system then determines if the maximum wall time has been exceeded (step 504).

If the wall time has not been exceeded, the system determines if the steady-state has converged or it the time-accurate mean-steady-state has been reached depending upon the system mode (step 506). If not, the system then determines if an interrupt or terminate signal has been caught (step 508).

If the system has not caught an interrupt or terminate signal, the process returns "no" (step 510). Otherwise, if the response to any of the above tests has been yes, the system returns "yes" (step 512).

Flow Solver

The flow solver used in one embodiment of this invention is ARC2D, a finite-difference two-dimensional compressible Reynolds-averaged, Navier-Stokes (RaNS) solver produced at NASA Ames Research Center by Pulliam and Steger. The ARC2D solver contains many numerical schemes and is greatly optimized for computational efficiency, which makes it an ideal candidate for large parameter studies such as C81 table generation. This solver is capable of analyzing any geometry that can be modeled with a single structured C- or O-mesh. Computations can be conducted in either steady-state or time-accurate modes. Steady-state calculations utilize space-varying time steps for improved convergence rates, and the user is given the power to define mesh and time step sequencing scenarios to further enhance computational efficiency. Time-accurate solutions can be run with a second-order accurate subiteration time-advancing scheme, in which the user can specify values for parameters such as the number of subiterations, physical time step and pseudo time step. ARC2D contains an assortment of turbulence models: Baldwin-Lomax, Baldwin-Barth, Spalart-Allmaras (several variations), and a two-equation model. Unfortunately, not all models are compatible with all grid geometries and time-accurate calculations. ARC2D also has the option to use low-Mach number preconditioning, which is meant to improve the solver accuracy and efficiency as the flow approaches incompressible conditions. However, preconditioning was not utilized in the current embodiment of the present invention.

In the following sections, ARC2D is discussed in more detail with attention paid to the Navier-Stokes equations, curvilinear coordinate transformations, various numerical schemes and formulations, and boundary conditions. The one-equation Spalart-Allmaras turbulence model is also briefly described.

Navier-Stokes Equations

ARC2D solves the Navier-Stokes equations in strong conservation form in an effort to accurately capture shocks. The non-dimensionalized equations in Cartesian coordinates are shown in Equations. 1, 2 and 3:

$$\partial_t Q + \partial_x E + \partial_y F = Re^{-1}(\partial_x E_v + \partial_y F_v) \quad (1)$$

where $$Q = \begin{bmatrix} \rho \\ \rho u \\ \rho v \\ e \end{bmatrix}, \quad E = \begin{bmatrix} \rho u \\ \rho u^2 + p \\ \rho u v \\ u(e+p) \end{bmatrix}, \quad F = \begin{bmatrix} \rho v \\ \rho u v \\ \rho v^2 + p \\ v(e+p) \end{bmatrix}, \quad (2)$$

$$E_v = \begin{bmatrix} 0 \\ \tau_{xx} \\ \tau_{xy} \\ f_4 \end{bmatrix}, \quad F_v = \begin{bmatrix} 0 \\ \tau_{xy} \\ \tau_{yy} \\ g_4 \end{bmatrix}$$

with $$\tau_{xx} = \mu(4u_x - 2v_y)/3 \quad (3)$$

$$\tau_{xy} = \mu(u_y + v_x)$$

$$\tau_{yy} = \mu(-2u_x + 4v_y)/3$$

$$f_4 = u\tau_{xx} + v\tau_{xy} + \mu Pr^{-1}(\gamma-1)^{-1}\partial_x a^2$$

$$g_4 = u\tau_{xy} + v\tau_{yy} + \mu Pr^{-1}(\gamma-1)^{-1}\partial_y a^2$$

The equation of state is used to relate the flow variables in Q to the pressure as follows:

$$p = (\gamma - 1)\left(e - \frac{1}{2}\rho(u^2 + v^2)\right) \quad (4)$$

Generally, variables are non-dimensionalized by their freestream quantities as shown in Equation 5.

$$\tilde{\rho} = \frac{\rho}{\rho_\infty}, \quad \tilde{u} = \frac{u}{a_\infty}, \quad \tilde{v} = \frac{v}{a_\infty}, \quad \tilde{e} = \frac{e}{\rho_\infty a_\infty^2} \quad (5)$$

If l is taken as the reference length (l is commonly chosen to be the airfoil chord length), time is non-dimensionalized as shown in Equation 6.

$$\tilde{t} = \frac{t a_\infty}{l} \quad (6)$$

The viscous coefficients are defined in Equation 7

$$\tilde{\mu} = \frac{\mu}{\mu_\infty}, \quad Re = \frac{\rho_\infty l a_\infty}{\mu_\infty} \quad (7)$$

Note that Re is based upon $a_\infty$ instead of $u_\infty$ as is customary for experimental Reynolds numbers.

Curvilinear Coordinate Transformation

Figures 6, 7:
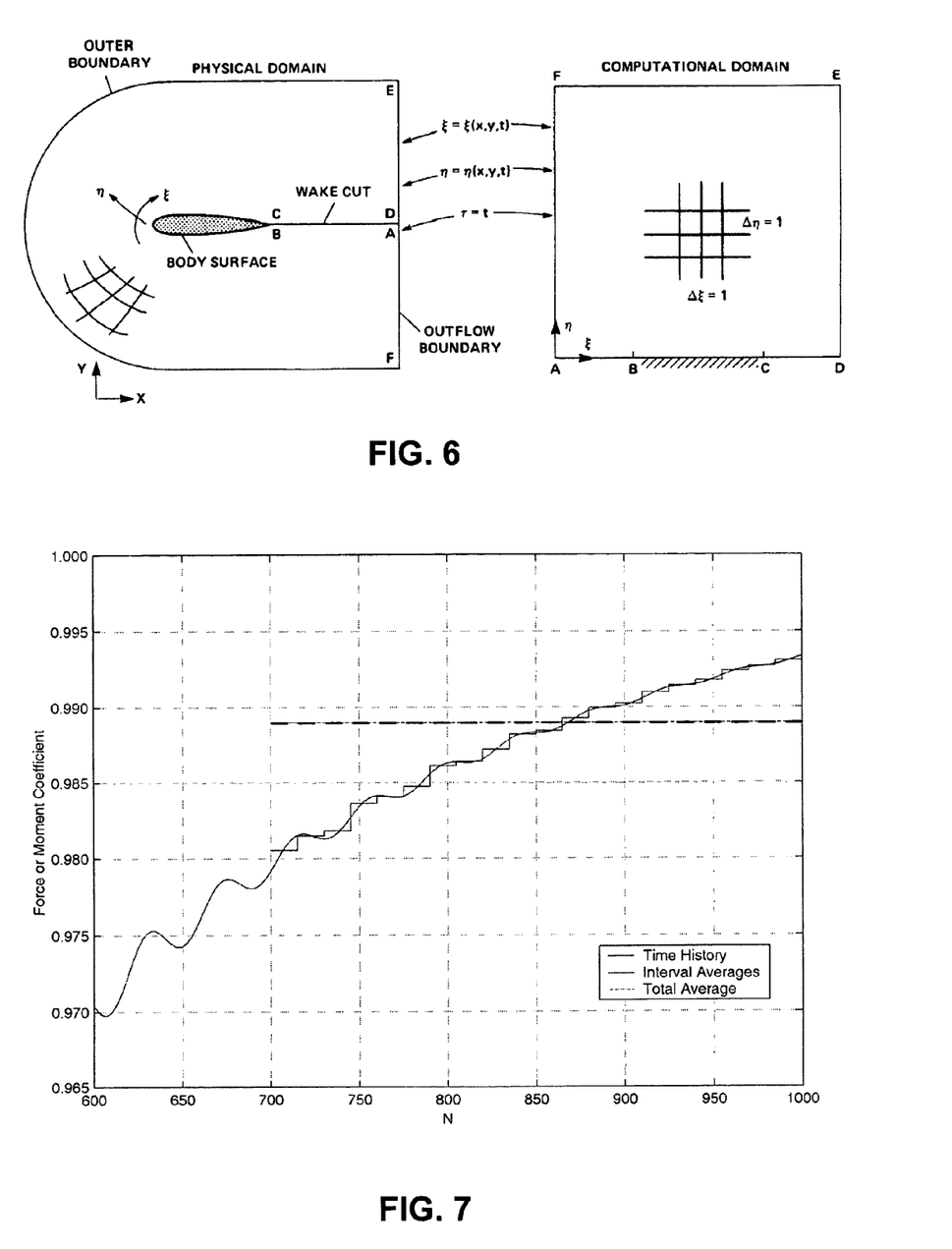
FIG. 6 illustrates curvilinear coordinate transformation form the physical domain to the computational domain in accordance with an embodiment of the present invention.
FIG. 7 illustrates a moving average analysis of a generic force or moment coefficient history in accordance with an embodiment of the present invention.

Body-fitted meshes are required to model arbitrary geometries. To simplify the differencing schemes, a curvilinear coordinate transformation is employed to map the body-fitted Cartesian x-y grid points to $\xi$-$\eta$ grid points, which lie on a uniform mesh with spacings of unit length. FIG. 6 from *Efficient Solution Methods for The Navier-Stokes Equations* by T. H. Pulliam shows the transformation of the physical domain (shown as a C-grid) to the $\xi$-$\eta$ computational domain. As Equation 8 demonstrates, $\xi, \eta$ and $\tau$ are functions of x, y, and t.

$$\tau = t$$

$$\xi = \xi(x,y,t)$$

$$\eta = \eta(x,y,t) \quad (8)$$

Cartesian derivatives can be expressed in the computational domain via the chain rule, and the result is given in Equation 9:

$$\begin{bmatrix} \partial_t \\ \partial_x \\ \partial_y \end{bmatrix} = \begin{bmatrix} 1 & \xi_t & \eta_t \\ 0 & \xi_x & \eta_x \\ 0 & \xi_y & \eta_y \end{bmatrix} \begin{bmatrix} \partial_\tau \\ \partial_\xi \\ \partial_\eta \end{bmatrix} \quad (9)$$

Finite difference approximations are used to determine the transformation metrics ($\xi_t, \xi_x, \xi_y, \eta_t, \eta_x, \eta_y$), which are defined in Equation 10:

$$\xi_x = J y_\eta, \xi_y = -J x_\eta, \xi_t = -x_\tau \xi_x - y_\tau \xi_y$$

$$\eta_x = -J y_\xi, \eta_y = J x_\xi, \eta_t = -x_\tau \eta_x - y_\tau \eta_y \quad (10)$$

where J, the metric Jacobian, is $$J = \frac{1}{x_\xi y_\eta - x_\eta y_\xi} \quad (11)$$

Once the transformation is known, the Navier-Stokes equations can be recast in terms of the generalized curvilinear coordinates as shown in Equation 12:

$$\partial_\tau \hat{Q} + \partial_\xi \hat{E} + \partial_\eta \hat{F} = Re^{-1}\left[\partial_\xi \hat{E}_v + \partial_\eta \hat{F}_v\right] \quad (12)$$

where $$\hat{Q} = J^{-1}\begin{bmatrix} \rho \\ \rho u \\ \rho v \\ e \end{bmatrix}, \quad \hat{E} = J^{-1}\begin{bmatrix} \rho U \\ \rho u U + \xi_x p \\ \rho v U + \xi_y p \\ U(e+p) - \xi_t p \end{bmatrix}, \quad (13)$$

$$\hat{F} = J^{-1}\begin{bmatrix} \rho V \\ \rho u V + \eta_x p \\ \rho v V + \eta_y p \\ V(e+p) - \eta_t p \end{bmatrix}$$

with the contravariant velocities $$U = \xi_t + \xi_x u + \xi_y v \text{ and } V = \eta_t + \eta_x u + \eta_y v \quad (14)$$

The viscous flux terms from Equation 12 are defined in Equation 15:

$$\hat{E}_v = J^{-1}(\xi_x E_v + \xi_y F_v), \quad \hat{F}_v = J^{-1}(\eta_x E_v + \eta_y F_v) \quad (15)$$

The τ stress terms are also transformed into curvilinear coordinates as shown in Equation 16:

$$\tau_{xx} = \mu(4(\xi_x u_\xi + \eta_x u_\eta) - 2(\xi_y v_\xi + \eta_y v_\eta))/3$$

$$\tau_{xy} = \mu(\xi_y u_\xi + \eta_y u_\eta + \xi_x v_\xi + \eta_x v_\eta)$$

$$\tau_{yy} = \mu(-2(\xi_x u_\xi + \eta_x u_\eta) + 4(\xi_y v_\xi + \eta_y v_\eta))/3$$

$$f_4 = u\tau_{xx} + v\tau_{xy} + \mu Pr^{-1}(\gamma-1)^{-1}(\xi_x \partial_\xi a^2 + \eta_x \partial_{72} a^2)$$

$$g_4 = u\tau_{xy} + v\tau_{yy} + \mu Pr^{-1}(\gamma-1)^{-1}(\xi_y \partial_\xi a^2 + \eta_y \partial_\eta a^2) \qquad (16)$$

Numerical Schemes

ARC2D numerical algorithms are implicit in nature. While implicit methods generally require much more computational work than their explicit counterparts, they benefit greatly from superior stability bounds. This advantage is particularly advantageous when highly refined grids are used, since a conditionally stable explicit scheme may require prohibitively small time steps in such cases.

ARC2D employs a three point implicit time differencing scheme of the form shown in Equation 17:

$$\Delta \hat{Q}^n = \frac{\vartheta \Delta t}{1+\varphi} \frac{\partial}{\partial t}(\Delta \hat{Q}^n) + \frac{\Delta t}{1+\varphi} \frac{\partial}{\partial t} \hat{Q}^n + \frac{\varphi}{1+\varphi} \Delta \hat{Q}^{n-1} + O\left[\left(\vartheta - \frac{1}{2} - \varphi\right)\Delta t^2 + \Delta t^3\right] \qquad (17)$$

where $$\Delta \hat{Q}^n = \hat{Q}^{n+1} - \hat{Q}^n \text{ and } \hat{Q}^n = \hat{Q}(n\Delta t) \qquad (18)$$

The θ and φ terms can be chosen so that the resulting scheme can achieve either first- or second-order accuracy in time. The first-order Euler implicit scheme is defined with θ=1 and φ=0, and the second-order three-point implicit and trapezoidal implicit schemes are attained with θ=1 and φ=½, and θ=½ and φ=0, respectively. For the purposes of this study, the Euler implicit scheme was used for steady-state calculations while the three-point implicit scheme was used for time-accurate dual-timestepping computations.

When Equation 17 is substituted into Equation 12, the flux vectors $\hat{E}$, $\hat{E}_v$, $\hat{F}$ and $\hat{F}_v$ are nonlinear functions of $\hat{Q}$. A Taylor's series expansion about $\hat{Q}^n$ is used to linearize the equations to second-order accuracy.

ARC2D approximates the continuous differential operators $\partial_\xi$ and $\partial_\eta$ with finite difference operators $\delta_\xi$ and $\delta_\eta$ on a uniformly spaced computational grid where $\Delta\xi=1$ and $\Delta\eta=1$. If j and k are considered to be grid-point indices, the second-order accurate central difference operators are defined in Equation 19:

$$\delta_\xi u_{j,k} = (u_{j+1,k} - u_{j-1,k})/2 \text{ and } \delta_\eta u_{j,k} = (u_{j,k+1} - u_{j,k-1})/2 \qquad (19)$$

ARC2D also has the capability to estimate derivatives with fourth and sixth order accurate central differencing schemes.

When the Navier-Stokes equations are cast in finite difference form, the linearized system of equations can be arranged into a large banded matrix. Although such a matrix is sparse, it is still numerically expensive to solve. To lessen this expense, an approximate factorization method is applied which transforms the single two-dimensional operator matrix into two one-dimensional operators. This factorization is accomplished by neglecting the cross derivative terms whose magnitudes scale as the square of the time step. The resulting matrices are in block tridiagonal form and are solved much more economically than the unfactored algorithm.

While the approximate factorization algorithm is an improvement over its unfactored counterpart, the implicit scheme is still computationally expensive when compared to explicit schemes. Further gains in computational efficiency can be achieved by reducing the number of variables, or blocks, from four (density, x-momentum, y-momentum and energy) to three (density, x-momentum and y-momentum), which is possible if constant total enthalpy is assumed or if similar thermodynamic approximations are used. The smaller set of equations can be solved if the thermodynamic relation replaces the energy equation.

The blocks in the implicit operators can also be diagonalized making the scheme more efficient. This formulation works very well for steady-state calculations since the explicit side of the diagonal algorithm is unchanged. Therefore if the implicit side converges, the diagonal scheme yields the same results as would the unfactored scheme but at a lower cost. Unfortunately, diagonalization of the implicit operator degrades the time accuracy of the scheme to first-order in time, which can result in erroneous time-accurate shock speeds and shock jumps.

While linear stability analyses show the implicit algorithm to be unconditionally stable, practical flow phenomena such as shocks present stability bounds for the algorithms. This problem stems from the fact that numerical schemes and discrete meshes cannot account for all scales of motion. High frequency scales of motion are the most problematic. This serious shortcoming can result in inaccurate solutions, or worse yet, numerical instability.

This issue is commonly addressed by adding numerical dissipation to the algorithm with a magnitude capable of drowning out higher frequencies within a solution without being large enough to adversely affect the physical accuracy of a calculation. In the early development of implicit finite difference codes, constant coefficient dissipation was added to the algorithm. Later on, schemes based upon upwinded differencing came into use, and their one-sided differences contain naturally occurring dissipation. Upwinding schemes are complex to code and have the disadvantage that the amount of dissipation cannot be prescribed explicitly. A simpler approach is to construct a scheme based upon central differences, which allows for a controllable amount of artificial dissipation.

ARC2D employs the nonlinear artificial dissipation model developed by Jameson, Schmidt and Turkel. The so-called JST model combines the second- and fourth-order dissipations in one expression shown in Equation 20 (only the ξ terms are presented here):

$$\nabla_\xi (\sigma_{j+1,k} J^{-1}_{j+1,k} + \sigma_{j,k} J^{-1}_{j,k})(\varepsilon^{(2)}_{j,k} \Delta_\xi Q_{j,k} - \varepsilon^{(4)}_{j,k} \Delta_\xi \nabla_\xi \Delta_\xi Q_{j,k})$$

where the difference operators are $$\nabla_\xi q_{j,k} = q_{j,k} - q_{j-1,k} \qquad \Delta_\xi q_{j,k} = q_{j+1,k} - q_{j,k} \qquad (21)$$

$$\nabla_\eta q_{j,k} = q_{j,k} - q_{j,k-1} \qquad \Delta_\eta q_{j,k} = q_{j,k+1} - q_{j,k}$$

and

-continued $$\varepsilon_{j,k}^{(2)} = \kappa_2 \Delta t \max(\Psi_{j+1,k}, \Psi_{j,k}, \Psi_{j-1,k}) \quad (22)$$

$$\Psi_{j,k} = \frac{|p_{j+1,k} - 2p_{j,k} + p_{j-1,k}|}{|p_{j+1,k} + 2p_{j,k} + p_{j-1,k}|}$$

$$\varepsilon_{j,k}^{(4)} = \max(0, \kappa_4 \Delta t - \varepsilon_{j,k}^{(2)})$$

The $\kappa_2$ and $\kappa_4$ terms are user specifiable second- and fourth-order dissipation coefficients, respectively. The $\Psi$ term is a pressure gradient coefficient that amplifies the second order dissipation near shocks. The $\sigma_{j,k}$ terms in Equation 20 are spectral radius scaling factors and are defined as $$\sigma_{j,k} = |U| + a\sqrt{\xi_x^2 + \xi_y^2} \quad (23)$$

Boundary Conditions

The numerical formulations of the Navier-Stokes equations require boundary conditions at body surfaces and farfield boundaries. ARC2D contains an assortment of boundary condition types including viscous, inviscid, adiabatic, and isothermal walls and several characteristic inflow/outflow farfield conditions. For lifting airfoils in subsonic freestream flow, ARC2D has the capability to apply circulation-based corrections to the flow variables at the farfield boundary. With the freestream velocity components defined as $u_\infty = M_\infty \cos(\alpha)$ and $v_\infty = M_\infty \sin(\alpha)$, corrected farfield velocities are computed according to Equation 24:

$$u_f = u_\infty + \frac{\beta \Gamma \sin\theta}{2\pi r(1 - M_\infty^2 \sin^2(\theta - \alpha))} \quad (24)$$

$$v_f = v_\infty - \frac{\beta \Gamma \cos\theta}{2\pi r(1 - M_\infty^2 \sin^2(\theta - \alpha))}$$

where the circulation is $\Gamma = \frac{1}{2} M_\infty c C_l$, the Prandtl-Glauert transformation factor is $\beta = \sqrt{1 - M_\infty^2}$, and r and $\theta$ are the polar coordinates for the farfield boundary location relative to the airfoil quarter-chord point. The farfield circulation correction was only used for steady-state calculations in this study.

Spalart-Allmaras One-Equation Turbulence Model

The Spalart-Allmaras turbulence model is widely used today and was the only model used in this study. This one-equation model was assembled using empiricism and dimensional analysis, Galilean invariance, and dependence on molecular viscosity. It is a largely local model, meaning that the equation at one point does not depend on the solution at other points. However, the model does include a wall destruction term for the eddy viscosity that is dependent on the distance to the surface. The local nature of the model simplifies its implementation on complex grid structures, including unstructured grids. The model is calibrated in two-dimensional mixing layers, wakes, and flat-plate boundary layers. While these calibrations are well suited to attached flow over airfoil geometries, they do not consider cases where massively separated flow regions are present, such as post-stall conditions contained within C81 tables.

It should be noted that the treatment of the transitional boundary layer region differs between the original model and its implementation in ARC2D. The Spalart-Allmaras model, as first described in the literature, employs a source term with a small domain of influence to initiate transition, or "trip" the flow, in a smooth manner. This approach is particularly advantageous when unstructured grids are used. In contrast, ARC2D and many other structured solvers have crude "on-off" logic or short ramps for controlling laminar and turbulent boundary layer regions. Simply stated, the codes either set the eddy viscosity to zero in the momentum equation or zero-out the gradients responsible for the generation of eddy viscosity within specified laminar flow regions. These regions are usually indicated by grid indices along the wall (i.e. a grid point corresponds to a trip location). While these implementations ensure the existence of the prescribed laminar flow, fully turbulent boundary layer conditions cannot be guaranteed directly downstream of a trip. The end-user must exercise care when specifying transition locations and verifying that transition does indeed occur in the final flow solution.

Steady-State Run Model

The steady-state run model runs a single flow calculation in the flow solver's steady-state mode. During the calculation, flow solver input parameters are modulated to maintain numerical stability, and calculation progress is evaluated based upon the findings of a moving-average routine and a convergence check of the calculation's residual history. The general behavior of the run model is shown in FIG. 2A above. If a steady result is obtained, the calculation will be stopped and the results are written to file. However, if a divergent residual trend is encountered, the calculation will be stopped and a suggestion is made to run the calculation in a time-accurate mode.

For steady-state calculations, numerical stability is most affected by the choice of the pseudo-time step. Numerical instabilities usually result in the presence of negative density or pressure values in the solution. Both are physical impossibilities, and the flow solver stops the calculation if they occur. The automation software detects this condition and reduces the pseudo-timestep. This reduction is conducted according to Equation 25:

$$dt_{pseudo}^{new} = \kappa_{pseudo} \cdot dt_{pseudo}^{current} \quad (25)$$

where the user defined scaling constant, $\kappa_{pseudo}$, can have values between 0.0 and 1.0. Its default value is 0.75. After every instance of a negative density or pressure condition, the pseudo-timestep is reduced. No attempt is made to increase the pseudo-timestep.

Upon the conclusion of each run, which is a small subset of the larger calculation, flow solution progress is evaluated with a moving-average routine. The averaging routine analyzes the lift, drag, and pitching moment coefficient histories over the final 50% of the calculation steps or the last 250 steps whichever is smaller. This parent interval is then averaged to determine reference values for the force and moment coefficients. The parent interval is broken into segments of constant length and averages are computed for each segment. This process is repeated for segment lengths of 5 to 15 flow solver steps. If all segment averages agree with the parent average within a tolerance, the solution is deemed steady and complete and the results are written to file. A visual explanation of this analysis is offered in FIG. 7.

The tolerances used for the moving average analysis are determined as a percentage of the parent interval average value. For cases with very small lift, drag or pitching moment results, user definable tolerances are used instead. The tolerance is determined from the relationship shown in Equation 26.

$$\epsilon = \max(\epsilon_{user}, \kappa_{ma} \cdot \text{parent interval average}) \quad (26)$$

where $\epsilon_{user}$ is the user defined absolute tolerance and $\kappa_{ma}$ is the user defined relative tolerance.

In addition to checking to see if the force and pitching moment histories are behaving in a steady manner, the overall trend of the residual history is checked after each run. This check is accomplished by determining the slope of the logarithm of the residual for the most recent run via a linear least-squares curve fit. If the slope of this fit is less than a user specifiable magnitude (a conservative default tolerance is 0.0002), the calculation is deemed convergent; conversely, if the slope exceeds the tolerance, the calculation is considered to be divergent and is stopped, and a suggestion is made that the calculation be run using the time-accurate run model.

Time-Accurate Run Model

The time-accurate run model conducts a single flow calculation in a time-accurate dual-timestepping mode. During the automated calculation, flow solver input variables are modulated to maintain numerical stability, and calculation progress is determined via a correlation analysis of the force and moment histories. Steady behavior is also possible in time-accurate calculations so the moving average routine described above in reference to the steady-state run model is conducted in addition to the correlation analysis. The general progression of an automated time-accurate calculation through the run model is outlined in FIG. 2A and is described above. If all force and moment coefficients pass either the correlation or moving average analyses, the calculation is deemed complete and will be stopped. Final results are written to file. If the calculation is not complete, it will be restarted until suitable results are obtained or one of the additional conditions in FIG. 5 is satisfied.

Figure 8:
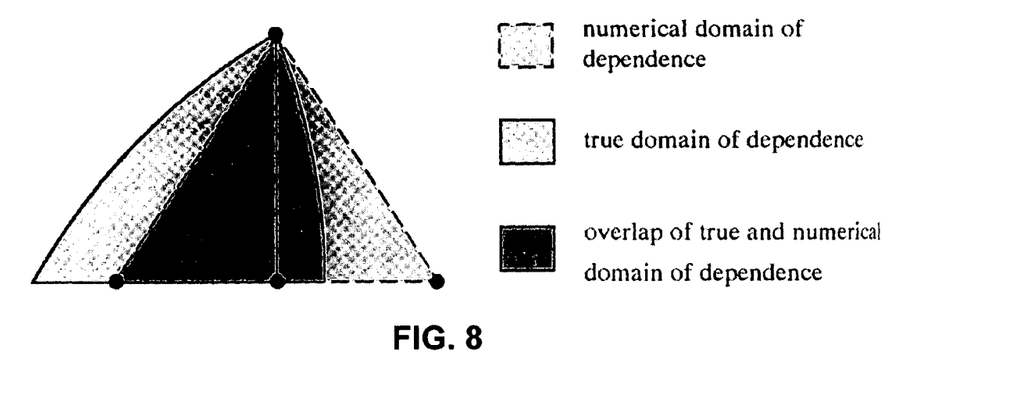
FIG. 8 illustrates overlapping numerical and physical domains of influence in accordance with an embodiment of the present invention.

Two flow solver input parameters, the $CFL_{max}$ number and the physical timestep, are modulated in a coupled fashion to maintain numerical stability during time-accurate calculations. Before proceeding, it will be helpful to describe the significance of the $CFL_{max}$ number in more detail. The Courant-Friedrichs-Levy (CFL) condition states "[the] full numerical domain of dependence must contain the physical domain of dependence." FIG. 8 from *Computational Gasdynamics* by C. B. Laney shows an instance where the CFL condition is violated. This is most relevant for cases in which supersonic flow exists in regions of small grid cells. By restricting the CFL number, the distance waves travel during a timestep can be limited by decreasing the duration of the timestep so that the physical and numerical domains of dependence overlap in accordance with the CFL condition. Effectively, time is artificially slowed in dense grid areas by lowering $CFL_{max}$. Subiteration techniques, such as dual-timestepping, can be used to maintain time-accuracy even when $CFL_{max}$ is affecting the pseudo-timestep in localized grid regions if sufficient subiteration convergence is obtained before the solution is advanced in time. The number of subiterations required to achieve second-order accuracy in time was not investigated during this study. A general rule-of-thumb is that the residual should be decreased by roughly two orders of magnitude during the subiteration process before the solution is advanced in time.

Modulation of the $CFL_{max}$ parameter is akin to swinging a double-edged sword. While it can ensure numerical stability if it is sufficiently low, excessive lowering of $CFL_{max}$ can force a physically unsteady flow to a steady solution. Decreasing the physical timestep can also help to satisfy the CFL condition by reducing the distance a wave travels during a timestep. The reduction of $CFL_{max}$ is more desirable since reducing the physical timestep equates to longer calculation time due to prolonged flow development. Coupled modulation of $CFL_{max}$ and the physical timestep was employed to avoid unrealistically steady solutions while maintaining acceptable calculation times.

Figure 9:
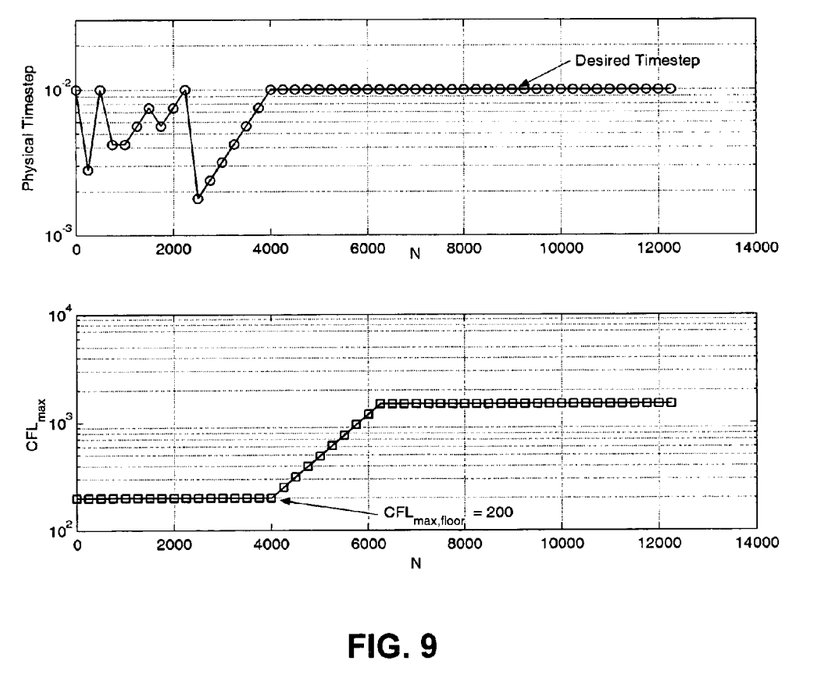
FIG. 9 illustrates a physical timestep and $CFL_{max}$ modulation history in accordance with an embodiment of the present invention.

The modulation methodology of $CFL_{max}$ and the physical timestep is depicted in FIG. 4 and is described above. The ultimate goal of this modulation process is to guarantee numerical stability in the calculation while developing the flowfield in as short a time as possible. This is accomplished by maintaining stability within the subiteration process via $CFL_{max}$ and stability within the time-advancing process via the physical timestep. In the event of an instability indicated by a negative density or pressure condition, $CFL_{max}$ is reduced while the physical timestep is held constant. This is continued until stability is achieved or until $CFL_{max}$ is lowered to a value designated $CFL_{max,floor}$. If $CFL_{max}$ is at $CFL_{max,floor}$, the physical timestep is reduced while $CFL_{max}$ is held constant. Generally, timestep reduction is only necessary during the beginning of a computation due to transient starting behavior or high Mach number flow. In the event that the preceding run was successful, an increase in the physical timestep is attempted if the current timestep is smaller than its target value, or $CFL_{max}$ is increased so that its effect on the solution is minimized. The modulation behavior history for a case at $M_\infty=0.8$ and $\alpha=60°$ is shown in FIG. 9.

The automation software operates on the assumption that all time-accurate force and moment histories should exhibit either steady or repetitive oscillatory behavior. Both conditions are handled within the calculation progress analyses of the time-accurate run model. First, a moving average routine is used to determine if the solution is steady. If the force or moment coefficient is indeed steady, a value for the coefficient is reported and the next coefficient is analyzed. However, if the behavior is not steady, the investigation continues with a correlation analysis.

If a solution is unsteady, it should exhibit some sort of repeating oscillatory pattern, and to be complete, the solution should achieve a mean steady-state meaning that the period averages of an oscillatory time history no longer vary with time. A correlation analysis is employed to determine the time history periods and their averages so that a decision regarding the attainment of a mean steady-state can be made. In the correlation routine, an interval of calculation steps at the end of the force and moment history called a stencil is moved back in time and compared to the history it overlaps. This is best described by FIG. 10. A correlation factor 1002 is calculated at each point in time to quantify how well the stencil 1006 correlates with the parameter history 1004 it overlaps. When the stencil 1006 closely resembles the history 1004 at an earlier time, the correlation factor will be near unity. A perfect match will result in a correlation factor equal to unity.

Figure 10:
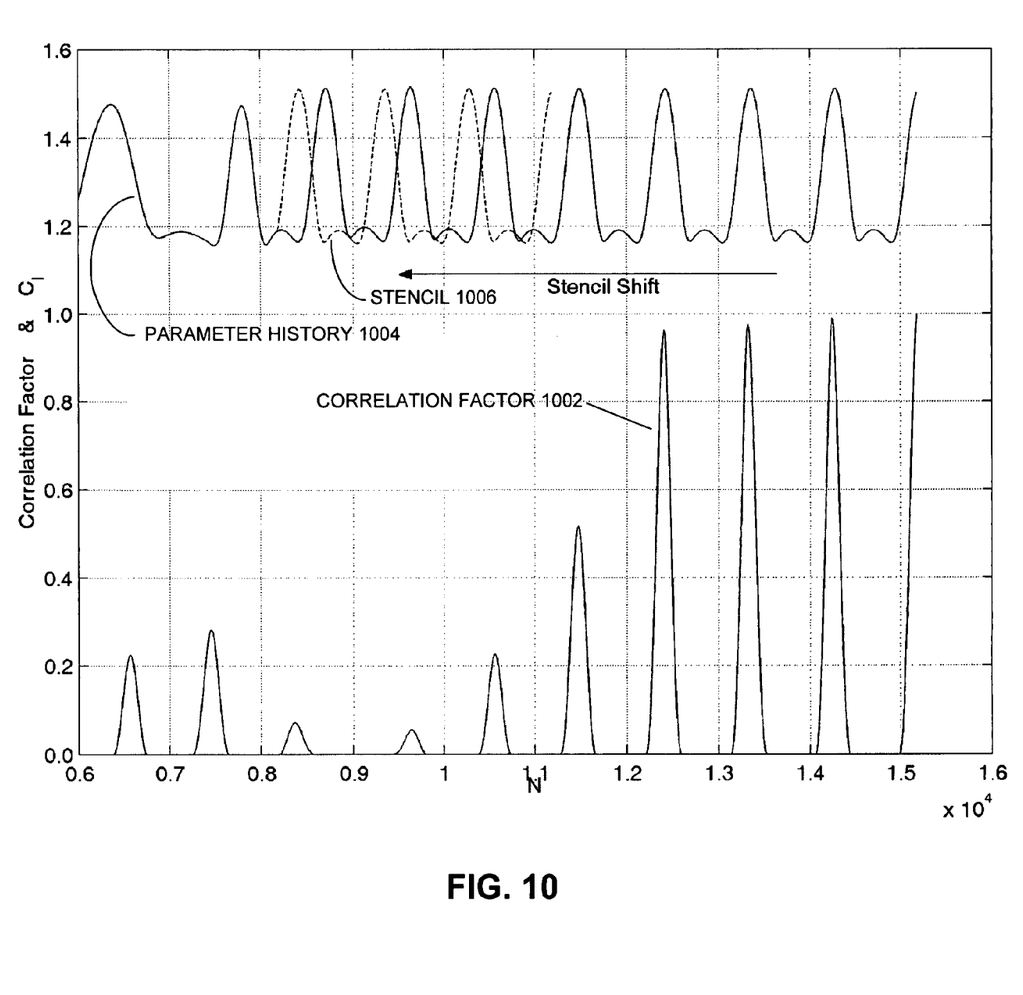
FIG. 10 illustrates correlation analysis of the lift coefficient in accordance with an embodiment of the present invention.

Determination of the correlation factor incorporates the calculation of a standard correlation coefficient and a scaling factor based upon the average value of all the points within the stencil 1006 and the average value of the interval to which the stencil 1006 is compared. In the following explanation, values associated with the stencil 1006 are denoted by the letter A and the underlying interval by the letter B. To form the correlation coefficient one needs the mean values (Equations 27 and 28) and variances (Equations 29 and 30)

of both samples being compared. The sample covariance (Equation 31) is needed as well.

$$\bar{A} = \frac{1}{n}\sum_{j=1}^{n} A_j \quad (27)$$

$$\bar{B} = \frac{1}{n}\sum_{j=1}^{n} B_j \quad (28)$$

$$s_A^2 = \frac{1}{n-1}\sum_{j=1}^{n}(A_j - \bar{A})^2 \quad (29)$$

$$s_B^2 = \frac{1}{n-1}\sum_{j=1}^{n}(B_j - \bar{B})^2 \quad (30)$$

$$s_{AB} = \frac{1}{n-1}\sum_{j=1}^{n}(A_j - \bar{A})(B_j - \bar{B}) \quad (31)$$

The correlation coefficient, r, is given below (Equation 32). Since negative correlation is of little importance here, the correlation coefficient is modified (Equation 33) so that spurious results are not obtained later in the analysis.

$$r = \frac{s_{AB}}{s_A s_B} \quad (32)$$

$$R = \max(0, r) \quad (33)$$

If the stencil 1004 and subinterval behave in similar fashions but have different mean values, the correlation coefficient will still be near unity. Cases such as these must be filtered out with a scaling factor (Equation 34) that accounts for the difference between sample means. The user specifiable weighting term, $\kappa_{sf}$, is 4.0 by default.

$$SF = 1 - \kappa_{sf}|\bar{B} - \bar{A}| \quad (34)$$

The final analysis result is the correlation factor (Equation 35), a weighted combination of the modified correlation coefficient and the scaling factor. The user specifiable weighting factors $\Phi$ and $\Pi$ have default values of 5.0 and 2.0 respectively.

$$CF = SF^{\Phi} R^{\Pi} \quad (35)$$

A value for the correlation factor is calculated each time the stencil is moved one flow solver step back in time. An example of a correlation factor distribution 1002 is shown in FIG. 10. The beginning of periods can be determined from the peaks of the correlation factor 1002 distribution. If a peak has a magnitude within a certain tolerance of unity, its location is tagged as the start of a period. Once a user-defined number of periods are detected, their averages and a total average over all periods are calculated. If all of the period averages are within a tolerance of the total average the force or moment coefficient has reached a mean steady-state and the result reported. The tolerance is a user-defined percentage of the total average or an absolute user-defined tolerance, whichever is larger.

Mixed-Type Run Models

There exist a large number of flow conditions near the onset of stall where the ultimate flow behavior, steady or unsteady, is not known before the start of a calculation. For this reason, combinations of the steady-state and time-accurate run models have been implemented. Two such run models are included in the automation software. Both start calculations as if the steady-state run model was controlling them, but if the residual check fails, the computation is switched into time-accurate mode. The two run models differ in how this switchover is handled. The first model restarts the calculation time-accurately with the solution obtained from the last steady-state run. In contrast, the second model starts the computation from scratch in time-accurate mode if the previous steady-state run exhibited a divergent residual trend.

Choosing the steady-state or time-accurate run models at the start of a calculation is analogous to predicting the future. This is actually possible for many cases. For instance, a case at $M_\infty = 0.3$ and $\alpha = 2°$ is likely to be steady while one at $M_\infty = 0.3$ and $\alpha = 30°$ should be unsteady due to massively separated flow. This decision or prediction, however, requires that the user have some knowledge regarding expected flow characteristics. What if the decision is not clear because the flow conditions are in a grey area such as the onset of stall? This is where the mixed-type run model is most useful. If the flow is steady, the calculation will finish in a steady-state mode, and since steady-state calculations are much more efficient than their time-accurate counterparts, a great time savings is realized. If the flow happens to be unsteady, at least an attempt was made to attain an efficient steady-state solution while not jeopardizing physically correct modeling of flow phenomena.

The biggest disadvantage of the mixed-type run model is that it is not foolproof. There are cases that lie on the cusp between steady and unsteady flow that may be improperly handled by the run model due to the hard coded nature of the residual trend check tolerance. A very conservative solution to this problem is to run all calculations with the time-accurate run model, but this approach would be computationally expensive and unnecessary for many cases. For this reason, the mixed-type run models have the ability to force computations into time-accurate mode based upon their angle of attack. The user can specify this time-accurate angle of attack range.

C81 Table Generation

Until now, only the run models that run single jobs have been discussed, but C81 airfoil performance tables require that a large number of flow conditions be analyzed. To do so, the input file for the automation software must be parameterized according to the desired Mach number and angle of attack conditions. The job is then submitted to a computational resource and the resulting data gathered and written to a C81 table.

Input files are parameterized with a simple template approach. A template for the automation software input file is created in which text strings such as AFS_FSMACH and AFS_ALPHA denoted the fields for the freestream Mach number and angle of attack. A Perl script then replaces these fields with their proper values, write the result out to a new file, and use the file to run the automation software.

OpenPBS 2.3.16, by Veridian Information Solutions, Inc., is used to combine three dual AMD Athlon processor computers into a compute cluster. A Perl script is written to handle job submission to OpenPBS, and OpenPBS coordinated the submission of jobs to specific compute nodes. Each case is treated as a serial job that is assigned to its own CPU. As a result of this submittal approach, the generation of a C81 table is highly scalable, and the time required to generate the table is directly related to the number of processors available for computation.

Every supercomputing center is likely to have its own batch processing software and rules governing user etiquette. For this reason, no generalized job submittal software is presented for the present invention. The end user of the automation software is responsible for job submittal, but this task can be accomplished with existing tools that handle parameter studies and job submission to many types of computational resources.

With C81 tables normally consisting of 500 or more $M_\infty$-$\alpha$ pairings, tools are needed for determining the status of jobs and harvesting final data into C81 tables. Once again, Perl is used to create these tools. This software allows the user to query the C81 table cases for completeness. If a job needs to be restarted, its flow parameters and file archive location can be written to a tab-delimited text file. The user can view the progression of restart cases listed in these files by plotting the force/moment, residual, physical timestep, and $CFL_{max}$ histories. If it appears that the calculation has progressed to the point of being complete but the automation software indicates otherwise, the user can override this by manually determining results using a correlation analysis with relaxed tolerances or a brute force time averaging routine. Lastly, the results from all cases are written to a C81 table file.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automatically generating a performance table for an object, wherein the object is subject to fluid flow, comprising:
   receiving a description of the object, wherein the object is a physical object and wherein the description is a curvilinear coordinate transformation of the physical object;
   receiving testing parameters for the object;
   executing a flow solver using the testing parameters and the description of the object to produce an output;
   determining if the output of the flow solver indicates negative density or pressure;
   if not,
      analyzing the output to determine if the output is converging, and
      if converged, writing the output to the performance table for the object; and
   using the performance table to analyze the performance of the object when the object is subjected to the fluid flow.

2. The method of claim 1, wherein if the output of the flow solver indicates negative density or pressure, the method further comprises:
   adjusting a testing parameter;
   executing the flow solver again to produce a new output; and
   determining if the new output indicates negative density or pressure.

3. The method of claim 2, wherein if a system mode is "steady-state," adjusting the testing parameter involves decreasing a time step for the flow solver.

4. The method of claim 2, wherein if a system mode is "time-accurate," adjusting the testing parameter involves modulating a Courant-Friedrichs-Levy number limit for the flow solver.

5. The method of claim 2, wherein if a system mode is time-accurate, adjusting the testing parameter involves adjusting a physical time step for the flow solver.

6. The method of claim 2, wherein if a system mode is time-accurate, adjusting the testing parameter involves adjusting a pseudo-time step for the flow solver.

7. The method of claim 1, wherein if a system mode is steady-state, analyzing the output involves analyzing a residual error using a regression analysis.

8. The method of claim 7, wherein if the history of the residual error indicates numerical divergence, the method involves setting the system mode to time-accurate.

9. The method of claim 7, wherein if a system mode is steady-state, analyzing the output involves analyzing a performance parameter for the object using a moving average technique, wherein the performance parameter includes one of a lift, a drag, and a pitching moment.

10. The method of claim 1, wherein if a system mode is time-accurate, analyzing the output involves performing a time-correlation analysis of a performance parameter history.

11. The method of claim 1, wherein being subject to fluid flow involves at least one of:
   fluid flow through the object; and
   fluid flow over the object.

12. A computer-readable storage medium storing instructions that when executed by a computer cause the computer to perform a method for automatically generating a performance table for an object, wherein the object is subject to fluid flow, the method comprising:
   receiving a description of the object, wherein the object is a physical object and wherein the description is a curvilinear coordinate transformation of the physical object;
   receiving testing parameters for the object;
   executing a flow solver using the testing parameters and the description of the object to produce an output;
   determining if the output of the flow solver indicates negative density or pressure;
   if not,
      analyzing the output to determine if the output is converging, and
      if converged, writing the output to the performance table for the object; and
   using the performance table to analyze the performance of the object when the object is subjected to the fluid flow.

13. The computer-readable storage medium of claim 12, wherein if the output of the flow solver indicates negative density or pressure, the method further comprises:
   adjusting a testing parameter;
   executing the flow solver again to produce a new output; and
   determining if the new output indicates negative density or pressure.

14. The computer-readable storage medium of claim 13, wherein if a system mode is "steady-state," adjusting the testing parameter involves decreasing a time step for the flow solver.

15. The computer-readable storage medium of claim 13, wherein if a system mode is "time-accurate," adjusting the testing parameter involves modulating a Courant-Friedrichs-Levy number limit for the flow solver.

16. The computer-readable storage medium of claim 13, wherein if a system mode is time-accurate, adjusting the testing parameter involves adjusting a physical time step for the flow solver.

17. The computer-readable storage medium of claim 13, wherein if a system mode is time-accurate, adjusting the testing parameter involves adjusting a pseudo-time step for the flow solver.

18. The computer-readable storage medium of claim 12, wherein if a system mode is steady-state, analyzing the output involves analyzing a residual error using a regression analysis.

19. The computer-readable storage medium of claim 18, wherein if the history of the residual error indicates numerical divergence, the method involves setting the system mode to time-accurate.

20. The computer-readable storage medium of claim 18, wherein if a system mode is steady-state, analyzing the output involves analyzing a performance parameter for the object using a moving average technique, wherein the performance parameter includes one of a lift, a drag, and a pitching moment.

21. The computer-readable storage medium of claim 12, wherein if a system mode is time-accurate, analyzing the output involves performing a time-correlation analysis of a performance parameter history.

22. The computer-readable storage medium of claim 12, wherein being subject to fluid flow involves at least one of:
fluid flow through the object; and
fluid flow over the object.

23. An apparatus for automatically generating a performance table for an object, wherein the object is subject to fluid flow, comprising:
a receiving mechanism configured to receive a description of the object,
wherein the receiving mechanism is further configured to receive testing parameters for the object;
an executing mechanism configured to execute a flow solver using the testing parameters and the description of the object to produce an output;
a determining mechanism configured to determine if the output of the flow solver indicates negative density or pressure;
a analyzing mechanism configured to analyze the output to determine if the output is converging; and
a writing mechanism configured to write the output to the performance table for the object.

24. The apparatus of claim 23, further comprising:
an adjusting mechanism configured to adjust a testing parameter;
wherein the executing mechanism is further configured to execute the flow solver again to produce a new output; and
wherein the determining mechanism is further configured to determine if the new output indicates negative density or pressure.

25. The apparatus of claim 24, wherein if a system mode is "steady-state," adjusting the testing parameter involves decreasing a time step for the flow solver.

26. The apparatus of claim 24, wherein if a system mode is "time-accurate," adjusting the testing parameter involves modulating a Courant-Friedrichs-Levy number limit for the flow solver.

27. The apparatus of claim 24, wherein if a system mode is time-accurate, adjusting the testing parameter involves adjusting a physical time step for the flow solver.

28. The apparatus of claim 24, wherein if a system mode is time-accurate, adjusting the testing parameter involves adjusting a pseudo-time step for the flow solver.

29. The apparatus of claim 23, wherein if a system mode is steady-state, analyzing the output involves analyzing a residual error using a regression analysis.

30. The apparatus of claim 29, wherein if the history of the residual error indicates numerical divergence, the method involves setting the system mode to time-accurate.

31. The apparatus of claim 29, wherein if a system mode is steady-state, analyzing the output involves analyzing a performance parameter for the object using a moving average technique, wherein the performance parameter includes one of a lift, a drag, and a pitching moment.

32. The apparatus of claim 23, wherein if a system mode is time-accurate, analyzing the output involves performing a time-correlation analysis of a performance parameter history.

33. The apparatus of claim 23, wherein being subject to fluid flow involves at least one of:
fluid flow through the object; and fluid flow over the object.

* * * * *